United States Patent [19]
Guerin

[11] Patent Number: 6,088,923
[45] Date of Patent: Jul. 18, 2000

[54] DEVICE AND METHOD FOR CHECKING THE GEOMETRY OF A HOLE BORED IN A PART

[75] Inventor: Sylvain Guerin, Seclin, France

[73] Assignee: Dassault Aviation, Paris, France

[21] Appl. No.: 09/046,651

[22] Filed: Mar. 24, 1998

Related U.S. Application Data

[63] Continuation of application No. PCT/FR96/01498, Sep. 25, 1996.

[30] Foreign Application Priority Data

Sep. 26, 1995 [FR] France .................................. 95 11271

[51] Int. Cl.⁷ ..................................................... G01B 3/00
[52] U.S. Cl. ............................... 33/542; 33/543; 33/544.1
[58] Field of Search ............................. 33/542, 543, 544, 33/544.1, 544.2, 544.3

[56] References Cited

U.S. PATENT DOCUMENTS

| | | | |
|---|---|---|---|
| 3,909,951 | 10/1975 | Meier | 33/542 |
| 4,407,157 | 10/1983 | Lichtenberg | 33/544.3 |
| 4,476,634 | 10/1984 | Yamamoto et al. | 33/542 |
| 4,753,555 | 6/1988 | Thompson | 33/542 |
| 5,189,808 | 3/1993 | Evans et al. | 33/542 |

FOREIGN PATENT DOCUMENTS

| | | | |
|---|---|---|---|
| 0 373 644 A1 | 6/1990 | European Pat. Off. | |
| 60-252206 | 12/1985 | Japan | |
| 16703421 | 8/1991 | U.S.S.R. | 33/544 |

*Primary Examiner*—Diego Gutierrez
*Assistant Examiner*—Faye Francis
*Attorney, Agent, or Firm*—Burns, Doane, Swecker & Mathis LLP

[57] ABSTRACT

A sensor arm (1) is inserted into a hole (3). The arm is mounted on a pivot (5) perpendicular to the arm axis so that it may be urged into engagement with the wall of the hole, e.g. by an air cylinder (12). The pivot (5) is in turn rotated about an axis passing through the hole, preferably by means of a rotary body (10). A bearing piece (16) controlling the sensor arm may be moved towards or away from the hole and rigidly supports a light sensor (8) that receives a light beam (7) from the sensor arm. The geometry of the hole is determined on the basis of the position where the light beam impinges on the sensor and the position of the bearing piece relative to the hole.

8 Claims, 3 Drawing Sheets

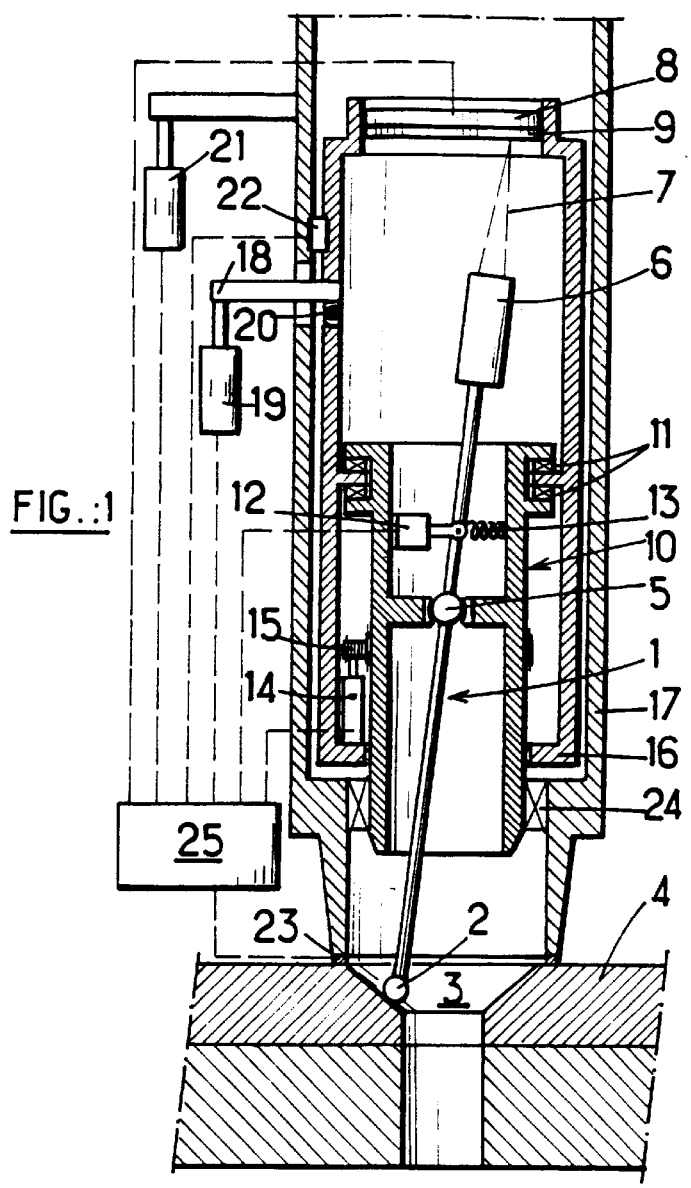
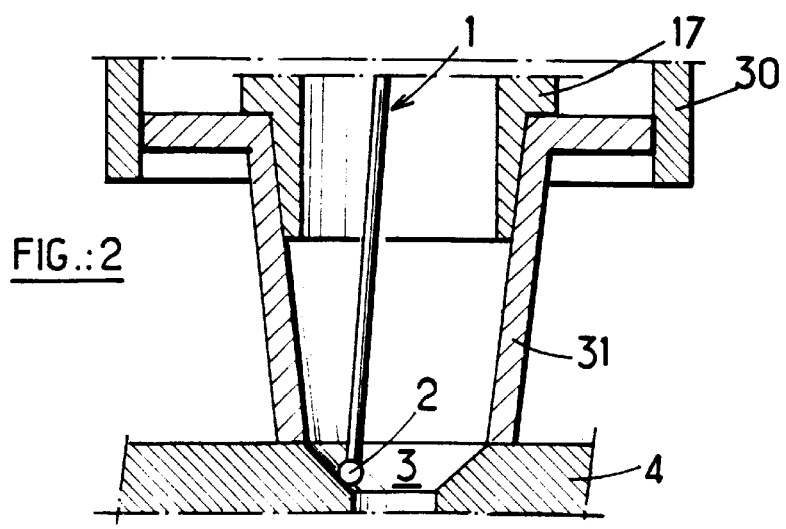

6,088,923

DEVICE AND METHOD FOR CHECKING THE GEOMETRY OF A HOLE BORED IN A PART

The present application is a continuation application of PCT patent application PCT/FR96/01498 filed on Sep. 25, 1996 and claiming the priority of French patent application No. 95 11271 filed on Sep. 26, 1995.

BACKGROUND OF THE INVENTION

The present invention concerns a device and a method for checking the geometry of a hole.

The present invention originated in the development of equipment for automatically riveting parts, for example metal plates. Document EP-A-402.222 in the name of the Applicant, for example, describes devices that include a system mounted on two robot arms disposed on respective opposite sides of two parts to be riveted together, these systems including means for holding the two plates in an appropriate position while a hole is bored in the parts, a rivet is inserted therein and the rivet is shaped to join the plates, all these operations taking place without direct manual intervention.

Great consistency is necessary in the geometrical characteristics of the hole and of the rivet before shaping to obtain a satisfactory surface state of the parts riveted together. In particular if the rivet, when shaped, must be flush with the surface of a part, which requires a countersunk hole, relatively small variations in the volume of the hole can obviously lead to the rivet projecting above or lying below the surface of the part. What is more, technological improvements require an accurate knowledge of the energy required to shape the rivet and this energy is dependent on the dimensions of the hole.

Until now the only way to avoid such problems has been to carry out manual and visual checks at regular intervals to ensure that the tooling creates each time holes that remain within the accepted tolerance limits. In the case of countersinks in particular such checks are performed manually by inserting gauges in the hole. This is a meticulous operation requiring a skilled operative.

SUMMARY OF THE INVENTION

An aim of the present invention is to provide an improved device for checking the geometry of the hole producing precise indications as to the shape and the volume of the hole.

To obtain this result the invention provides a device that includes:

an external support equipped with means for moving it into and holding it in a fixed position relative to the hole and holding it in this position, a bearing piece mounted on the external support and capable of moving relative to the external support in a first direction that moves it towards or away from the hole, the bearing piece being equipped with means for driving said movement and a sensor responsive to the position of the bearing piece relative to the external support, a sensing system including a sensor arm having an axis, mounted to be able to pivot relative to the bearing piece and carrying a contact member at one end and a source at the other end capable of projecting a light beam, the sensing system being mounted on the bearing piece and equipped with means for exerting on the measuring arm a transverse force tending to move the direction of the axis of the sensor arm away from the first direction and means for rotating the sensor arm about a rotation axis parallel to the first direction without moving it in the first direction relative to the bearing piece, a photo-sensitive sensor fixedly mounted on the bearing piece and having a sensitive surface adapted to have the light beam impinge on it during rotation of the sensor arm, and data processing means adapted to receive signals from the sensor responsive to the position of the bearing piece and signals from the photosensitive sensor and to deduce therefrom information relating to the shape of the hole.

The transverse force must be sufficient to assure that the contact member always bears on the surface of the hole but must be sufficiently low not to cause elastic, still less permanent, deformations of the surface of the hole or flexing of the sensor arm.

Each position of the contact member relative to the bearing part corresponds to a position of the point of impact of the light beam on the sensitive surface of the sensor. Assume that the hole is circular and cylindrical or conical and that the sensing system is coaxial with it the movement of the contact member into the hole will cause the point of impact of the light beam on the sensitive surface to trace out a circle. If the hole is conical the radius of the circle will vary as the bearing piece moves along the axis of the hole. Simple calculations accurately define the geometrical characteristics of the entire hole.

In a preferred embodiment the measuring system includes a rotary body which is carried by the bearing piece in such a way that it can turn relative to the bearing piece about an axis parallel to the first direction and is equipped with means for rotating it, the rotary body being coupled to the measuring arm by a pivot the axis of which is perpendicular to the first axis and to the second axis and carrying said means for exerting the transverse force on the measuring arm.

Note that it is possible to dispense with the rotary body if the measuring arm is mounted on the bearing piece through the intermediary of a ball joint and the means for exerting said transverse force and rotating the measuring arm are carried by the bearing piece.

An embodiment of this kind is lighter in weight but more difficult to construct since the same part must be driven with two separate movements.

The transverse force can be produced in various ways, for example by centrifugal force acting on a weight eccentric to the axis of the sensor arm. This solution is generally not suitable because it requires high rotation speeds. An air cylinder is advantageously used, the pressure in which can be controlled and which bears on the rotary body, if there is one, or on the bearing piece if there is no rotary body. This solution has the advantage of enabling the pressure to be adapted to suit individual circumstances, such as the material in which the hole is bored, and of assuring a substantially constant force regardless of how far the sensor arm pivots relative to the first direction. To some extent this would not be the case, in particular if magnetic stressing means were used, or even a spring.

It is preferable for the pivot angle to have been reduced to zero before inserting the sensor arm into the hole, which can be done manually using simple and removable mechanical holding means. It is preferable to provide spring means opposing the action of the means for creating the transverse force.

The bearing piece can move along any path, for example along a circular arc, being mounted on an eccentric pivot so that this path moves the bearing piece towards or away from the hole. The data processing means can then be programmed to allow for the real shape of this path. However, the simplest solution is to have the bearing piece capable of movement along a rectilinear path substantially parallel to the axis of the hole to be checked, assuming that this hole has an axis.

In this case, the exterior support carries rectilinear guide means for the bearing piece, for example a ball bush.

In accordance with one advantageous feature, the device as described hereinabove is designed to be mounted on an effector on which are also mounted locating means for holding and clamping together two parts to be riveted together, means for preparing a hole in the parts, means for placing a rivet in the hole and means for shaping the rivet to join the parts, these means being adapted to be moved substantially onto the axis of the hole in succession.

The exterior support is advantageously designed to engage with the locating means when the latter hold and clamp the parts to be riveted together.

A method in accordance with the invention for using the device just described advantageously includes the following steps:

placing the bearing piece in a retracted position relative to the external support, the sensor arm having its axis held substantially parallel to the first direction, moving the external support until it is in said fixed position relative to the hole, the axis of the sensor arm penetrating into the hole, moving the bearing piece towards an extended position so as to cause the contact member to penetrate into the hole, the external support being held fixed, applying the transverse force to the sensor arm until the contact member bears on an inside surface of the hole, actuating the means for driving the movement of the bearing piece and the rotation of the sensor arm successively and alternately or simultaneously, the light source and the photo-sensitive sensor being operative, transmitting signals representative of the position of the point of impact of the light beam and the position of the bearing piece to the data processing means.

BRIEF DESCRIPTION OF THE DRAWINGS

The invention will be described in more detail by means of a practical example illustrated by means of the drawings, in which:

FIG. 1 is a schematic axial section of a device in accordance with the invention.

FIG. 2 is a fragmentary view similar to FIG. 1 of a variant of the device.

DESCRIPTION OF THE PREFERRED EMBODIMENTS

Figure 3:
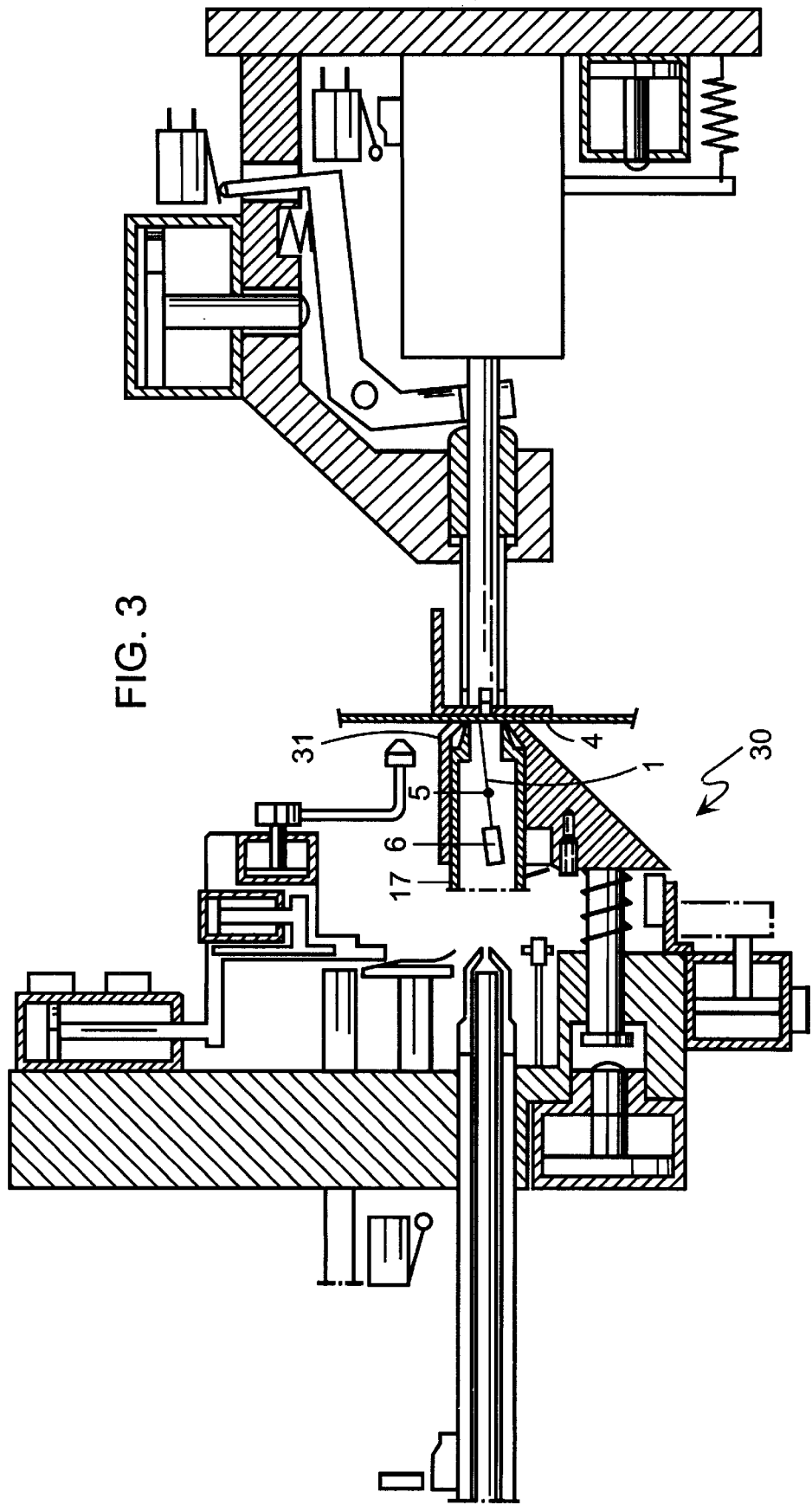
FIG. 3 is a view of the geometry checking device in combination with an effector.
Figure 4:
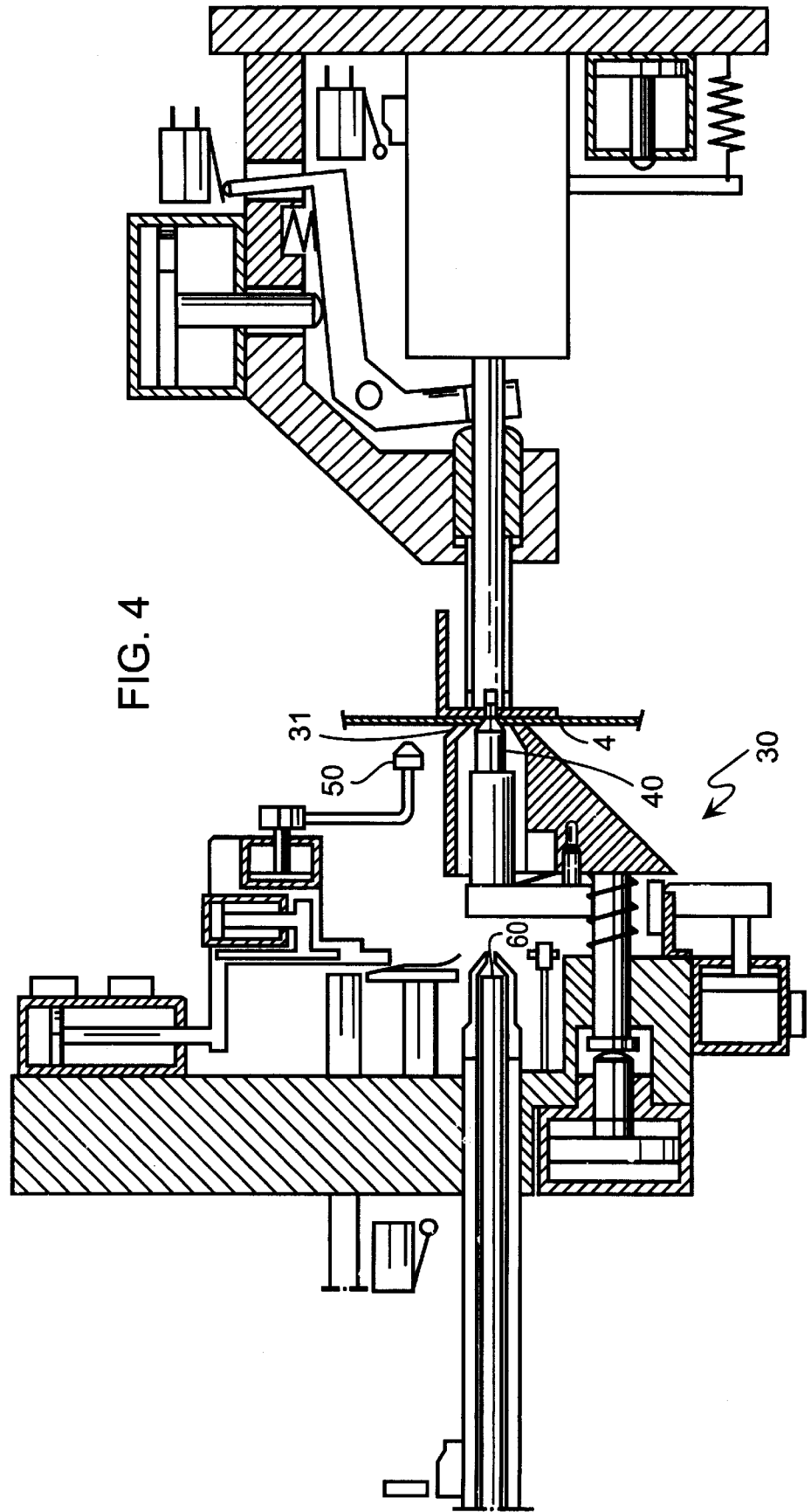
FIG. 4 is another view of the geometry checking device in combination with an effector.

An essential component of the device in accordance with the invention is a sensor arm 1 with a spherical contact member 2 mounted at one end. The contact member comes into contact with the inside surface of a hole 3 to be checked bored in a part 4. The sensor arm 1 is mounted on a pivot 5 part-way along its length. The sensor arm carries a light source 6, here consisting of a laser diode, at the end opposite the contact member 2. The light source emits a light beam 7 towards a photo-sensitive sensor 8 that has a sensitive surface 9 facing towards the source 6.

The axis of the pivot 5 is perpendicular to the axis of the sensor arm 1 and the pivot is mounted on a "rotary body" 10 the general shape of which is substantially cylindrical. The rotary body has bearings 11 and 24 the function of which is explained below. The rotary body carries an air cylinder 12 which bears on the rotary body and on the sensor arm 1 at a point away from the pivot 5. A return spring 13 opposes the action of the cylinder 12 and is rated to return the axis of the sensor arm 1 to a position parallel to the axis of the rotary body 10 when the cylinder 12 is not actuated. A drive motor 14 coupled to the rotary body by drive means 15 consisting of a friction device but which would equally well be a gear device rotates the rotary body 10 on its axis. The motor 14 is mounted on a bearing piece 16 that slides in an external support 17 the axis of which is parallel to that of the rotary body. The bearing piece 16 holds the rotary body 10 by means of bearings 11 comprising two needle bearings enabling the rotary body to rotate without allowing movement along the axis common to the rotary body and to the bearing piece. The bearing piece 16 carries a drive rod 18 that passes through a slot in the external support 17 and is connected to means 19 for driving the bearing piece. The drive means 19 are shown symbolically as a cylinder. In practice a pair of ball screws driven by an electric motor is used.

Means 20 symbolised as a spring are disposed between the drive means 19 and the bearing piece 17 to protect the device against impact.

Drive means 21 for the external support are adapted to move its locating cone into bearing engagement with the part 4 around the hole. In a practical embodiment the device is carried by a robot effector that has a locating cone and it is the locating cone of the effector which comes into contact with the part and the external support bears on the locating cone. A sensor 22 shown symbolically senses the position of the bearing piece relative to the external support. In practice it is an LVDT sensor sold by SENSOREX of Gaillard, France.

Note that there is no sensor for the angular position and the rotational position of the sensor arm. This position is sensed by the photosensitive sensor itself.

A sensor 23 indicates when the external support 17 and the part 4 come into contact. This sensor can be eliminated if the effector referred to above includes a sensor indicating when its locating means come into contact with the part.

A ball bush 24 is disposed inside the locating cone, between it and the rotary body. The ball bush guides the rotary body and thus assures extremely accurate positioning of the device and in particular of the sensor arm relative to the hole 3 to be checked.

As shown in dashed line, a controlling computer 25 is connected to the photo-sensitive sensor 8 and to the sensors 22 and 23 to receive the output signals of these units and is also connected to the control means of the cylinder 12, to the drive motor 14 and to the drive means 19 and 21 of the bearing piece and the external support.

For simplicity the means for supplying the cylinder 12 and the light source 6 with energy have not be shown. The compressed air supply can be via conventional rotary seals and the electrical power supply via rotary contacts. Chargeable or rechargeable electrical batteries or pressure accumulators could equally well be used. The light source 6 could also be replaced by a mirror attached to the sensor arm 1. In this case the light ray would simply be reflected by the mirror and returned to the photo-sensitive sensor. In this case the angles at which the light ray impinged on the photosensitive sensor would be twice the angles between the sensor arm 1 and the axis of the rotary body.

The entire device can be fitted to an effector provided with means for placing successively on the axis of the hole: a boring device, means for installing a rivet and means for shaping the rivet, as described in U.S. patent application Ser. No. 07/533,761 mentioned above, to assure automatic riveting of high quality.

FIG. 2 shows a portion of an effector 30 having a sliding locating cone 31 bearing on the part 4 around the hole 3 for holding and clamping together two parts to be riveted together. The end of the external support 17 then bears on the part 4 via the locating cone 3.

The effector 30 includes means 40 for preparing a hole, means 50 for placing a rivet in the hole, and means 60 for shaping the rivet.

I claim:

1. A device for checking the geometry of a hole bored in a part, comprising:

an external support equipped with means for moving the external support into and holding the external support in a fixed position relative to the hole and holding the external support in this position, a bearing piece mounted on the external support and capable of moving relative to the external support in a first direction that moves the bearing piece towards or away from the hole, the bearing piece having means for driving said movement and a sensor responsive to the position of the bearing piece relative to the external support, a sensing system including a sensor arm having an axis, mounted for pivoting relative to the bearing piece and carrying a contact member at one end and a source at the other end for protecting a light beam, the sensing system being mounted on the bearing piece and equipped with means for exerting on the sensor arm a transverse force tending to move the direction of the axis of the sensor arm away from the first direction and means for rotating the sensor arm about a rotation axis parallel to the first direction without moving it in the first direction relative to the bearing piece, a photo-sensitive sensor fixedly mounted on the bearing piece and having a sensitive surface on which the light beam impinges on the sensitive surface during rotation of the sensor arm, and data processing means adapted to receive signals from the sensor responsive to the position of the bearing piece and signals from the photo-sensitive sensor and to deduce therefrom information relating to the shape of the hole.

2. A device according to claim 1, wherein the sensing system includes a rotary body which is carried by said bearing piece in such a manner that it can turn relative to the bearing piece about an axis parallel to the first direction and is equipped with means for rotating it, the rotary body being coupled to said measuring arm by a pivot the axis of which is perpendicular to the first axis and to the second axis and carrying said means for exerting the transverse force on the measuring arm.

3. A device according to claim 2, wherein the external support carries guide means including a ball bush for the rotary body to stabilize better the position of the pivot relative to the hole.

4. A device according to claim 1, wherein the sensor arm is mounted on the bearing piece by means of a ball joint and the means for exerting said transverse force and rotating the sensor arm are carried by the bearing piece.

5. A device according to claim 1, wherein the means for exerting the transverse force include an air cylinder the pressure in which is controlled, the air cylinder bearing on a rotary body part of the bearing piece.

6. A combination including an effector and the device according to claim 1, on which effector are also mounted locating means for holding and clamping together two parts to be riveted together, means for preparing a hole in the parts, means for placing a rivet in the hole and means for shaping the rivet to join the parts, these means being adapted to be moved substantially onto the axis of the hole in succession.

7. A combination according to claim 6, wherein the external support is designed to engage with the locating means of the effector when the latter are holding and clamping the parts to be joined.

8. A method of checking the geometry of a hole using a device according to claim 1, comprising the following steps:

placing the bearing piece in a retracted position relative to the external support, the sensor arm having its axis held substantially parallel to the first direction, moving the external support until it is in said fixed position relative to the hole, the axis of the sensor arm penetrating into the hole, moving the bearing piece towards an extended position so as to cause the contact member to penetrate into the hole, the external support being held fixed, applying the transverse force to the sensor arm until the contact member bears on an inside surface of the hole, actuating the means for driving the movement of the bearing piece and the rotation of the sensor arm successively and alternately or simultaneously, the light source and the photo-sensitive sensor being operative, transmitting signals representative of the position of the point of impact of the light beam and the position of the bearing piece to the data processing means.

* * * * *